United States Patent [19]

Moore et al.

[11] Patent Number: 4,624,898

[45] Date of Patent: Nov. 25, 1986

[54] PROCESSES FOR THE APPLICATION OF REFRACTORY COMPOSITIONS TO SURFACES SUCH AS FOR THE PREPARATION OF REFRACTORY SHELL MOLDS AND REFRACTORY COMPOSITIONS PRODUCED THEREBY

[75] Inventors: John R. Moore, Florham Park; Stephen Maybaum, Short Hills, both of N.J.

[73] Assignee: Harborchem, Inc., Livingston, N.J.

[21] Appl. No.: 715,010

[22] Filed: Mar. 22, 1985

Related U.S. Application Data

[63] Continuation-in-part of Ser. No. 638,412, Aug. 7, 1984, abandoned.

[51] Int. Cl.[4] .................................................. B32B 9/04
[52] U.S. Cl. .................................. 428/446; 106/38.3; 106/38.35; 164/518; 164/519; 427/204; 427/397.7; 427/402; 427/403; 427/419.3; 428/701; 428/702
[58] Field of Search ............ 427/402, 403, 419.3, 427/397.7, 379, 133, 134, 135, 203, 204; 428/446, 323, 701, 212, 702, 703, 448; 106/38.2, 38.3, 38.35, 38.9; 164/518, 519

[56] References Cited

U.S. PATENT DOCUMENTS

| | | | |
|---|---|---|---|
| 2,703,913 | 3/1955 | Hinde et al. | 427/419.3 |
| 2,806,270 | 9/1957 | Shaul | 106/38.35 |
| 2,842,445 | 7/1958 | Emblem | 106/38.35 |
| 3,077,648 | 2/1963 | Sutherland | 427/419.3 |
| 3,165,799 | 1/1965 | Watts | 427/419.3 |
| 3,209,421 | 10/1965 | Shepherd | 427/419.3 |
| 3,270,382 | 9/1966 | Emblem | 106/38.3 |
| 3,292,220 | 12/1966 | Emblem | 106/38.3 |
| 3,367,393 | 2/1968 | Lenahan et al. | 106/38.3 |
| 3,607,319 | 9/1968 | Scott | 106/38.35 |
| 3,748,156 | 7/1973 | Moore, Jr. | 106/38.3 |
| 3,748,157 | 7/1973 | Moore, Jr. | 106/157 |
| 3,751,276 | 8/1973 | Beyer et al. | 106/38.3 |
| 3,752,679 | 8/1973 | Moore, Jr. | 106/38.35 |
| 3,752,680 | 8/1973 | Moore, Jr. | 106/38.35 |
| 3,752,681 | 8/1973 | Moore, Jr. | 106/38.35 |

List Continued on next page.

FOREIGN PATENT DOCUMENTS

| | | | |
|---|---|---|---|
| 529160 | 8/1956 | Canada | 106/38.3 |
| 544618 | 8/1957 | Canada | 106/38.35 |
| 554701 | 3/1958 | Canada | 106/38.3 |
| 49-20025 | 2/1974 | Japan | 427/419.3 |
| 51-32423 | 3/1976 | Japan | 106/38.3 |
| 51-44512 | 4/1976 | Japan | 427/419.3 |
| 731445 | 6/1955 | United Kingdom . | |
| 1031778 | 6/1966 | United Kingdom | 427/419.3 |
| 1309915 | 3/1973 | United Kingdom | 106/38.3 |
| 1403788 | 8/1975 | United Kingdom | 427/419.3 |

OTHER PUBLICATIONS

Wales, W. F., "Ceramic Binders and Aggregates for Precision Casting," AFS Transactions, pp. 249-259.
Buntrock Industries, "Quick-Set" Investment Shell Process, Jun., 1982.

Primary Examiner—Sadie L. Childs
Attorney, Agent, or Firm—Lerner, David, Littenberg, Krumholz & Mentlik

[57] ABSTRACT

A process is disclosed for providing a refractory composition on a surface. In the process an acidic hybrid binder composition and a basic colloidal silica sol composition are provided. The surface is coated with the acidic hybrid binder composition and the colloidal silica sol composition so that each colloidal silica sol composition coat contacts an acidic hybrid binder composition coat to form alternating layers of the acidic hybrid binder composition and the colloidal silica sol composition. Each acidic hybrid binder composition layer and each colloidal silica sol layer are dried prior to coating with the alternating layer to a sufficient hardness such that lift-off of the applied coatings from the surface is inhibited when a subsequent coating step is performed.

A refractory laminate composition is also disclosed which comprises a plurality of layers of hardened acidic hybrid binder composition alternating with a plurality of layers of hardened basic colloidal silica sol composition.

79 Claims, 1 Drawing Figure

COMPARATIVE DRYING CURVES
SEQUENTIAL VS. COLLOIDAL
6TH COAT

U.S. PATENT DOCUMENTS

| | | | |
|---|---|---|---|
| 3,752,689 | 8/1973 | Moore, Jr. | 106/38.35 |
| 3,754,945 | 8/1973 | Moore, Jr. | 106/38.35 |
| 3,754,946 | 8/1973 | Moore, Jr. | 106/38.35 |
| 3,767,458 | 10/1973 | Moore, Jr. | 106/38.35 |
| 3,854,961 | 12/1974 | Flasch | 106/38.3 |
| 3,859,153 | 1/1975 | Beyer et al. | 427/419.3 |
| 3,860,476 | 1/1975 | Moore, Jr. | 106/38.35 |
| 3,870,529 | 3/1975 | Okumoto et al. | 106/38.35 |
| 3,878,034 | 4/1975 | Bever et al. | 106/38.3 |
| 3,894,572 | 7/1975 | Moore, Jr. | 427/419.3 |
| 3,898,313 | 8/1975 | Taylor | 264/225 |
| 3,920,578 | 11/1975 | Yates | 106/38.3 |
| 3,961,968 | 6/1976 | Wales | 106/38.3 |
| 4,019,559 | 4/1977 | Szabo | 106/38.3 |
| 4,059,453 | 11/1977 | Dittrich et al. | 106/38.3 |
| 4,068,701 | 1/1978 | Emblem et al. | 106/38.35 |
| 4,078,029 | 3/1978 | Yoshida et al. | 106/38.35 |
| 4,204,872 | 5/1980 | Hayati et al. | 106/38.35 |
| 4,289,803 | 9/1981 | Wales et al. | 427/134 |
| 4,378,996 | 4/1983 | Yarwood | 106/38.35 | ns
PROCESSES FOR THE APPLICATION OF REFRACTORY COMPOSITIONS TO SURFACES SUCH AS FOR THE PREPARATION OF REFRACTORY SHELL MOLDS AND REFRACTORY COMPOSITIONS PRODUCED THEREBY

CROSS-REFERENCE TO RELATED APPLICATION

This application is a continuation-in-part of U.S. patent application Ser. No. 638,412 filed Aug. 7, 1984 now abandoned.

FIELD OF THE INVENTION

The present invention relates to a refractory laminate and to a process for preparing a refractory composition, e.g., a refractory shell mold. This refractory laminate and process are particularly useful for preparing an investment casting shell for the casting of metal.

BACKGROUND OF THE INVENTION

A number of techniques have been disclosed for preparing refractory shells for casting of metals. In a common method, a wax pattern is dipped into a refractory slurry consisting of a refractory flour such as zircon or fused silica in colloidal silica sol or in a hybrid binder composition. The coating produced in stuccoed with refractory particles or aggregate, for example, by dipping the coated pattern into a fluidized bed of the particles or by sprinkling the pattern with the particles. The dipping and stuccoing steps are repeated with drying after each stuccoing step. The major disadvantage of this technique is the long drying times required which can sometimes range up to about 72 hours per coat depending, for example, upon the thickness of the coating employed, the number of prior coats, the materials employed in the slurries, and the method of drying such as in forced air drying tunnels. Such methods require extensive drying equipment, labor, time and space, if a reduction in drying time is desired. Also, during the time that the coatings are soft and pliable, they are difficult to handle. Moreover, the drying of such coatings is subject to various temperature and humidity changes which can affect the precision of the refractory shell produced. In particular, because the moisture content can vary in the coating during the drying, it is difficult to maintain the temperature and humidity conditions necessary to avoid expansion or contraction of the pattern, which can result in the loss of the desired precision of the shell. Further, with coatings of colloidal silica sol, a gel is formed on drying, which gel shrinks and such shrinkage can cause undesirable cracking of the refractory, e.g., of the refractory shell, which can in turn cause metal leakage when molten metal is poured therein. Still further, if the underlying coats of colloidal silica sol, ethyl silicate or hybrid binder composition are not adequately dried prior to the application of the next coat thereof, the underlying coats can be rewetted or softened, which can cause the applied coatings to lift off from the surface of the wax mold which in turn causes undesirable bulges or in the extreme, holes in the resulting shell.

Others have attempted to provide chemical methods for setting of binder coatings. Various chemical setting techniques are disclosed in the art. For example, the "Background of the Invention" section of Moore U.S. Pat. No. 3,748,157 describes a number of such techniques. For example, the Moore patent mentions the chemical setting of sodium silicate-bonded shells containing ammonia by use of carbon dioxide and the use of ammonia to set hydrolyzed ethyl silicate or acidified aqueous colloidal silica-bonded shells. In addition, Moore mentions the use of volatile organic base to set shells bonded with hydrolyzed ethyl silicates. Other approaches mentioned in the Moore patent include the use of an acidified aqueous collidal silica to gel a basic colloidal silica and vice versa and the use of aqueous colloidal silica containing ammonia to set an ethyl silicate dip coat. The Moore patent itself is directed to a process for forming a refractory laminate on the surface of support structure in which the structure is dipped in a bath comprising a colloidal silica sol and/or a solution of alkaline ionic silicate to form a coating on the surface. The coated surface is contacted with a basic aluminum salt setting agent to firmly gel the colloidal silica or silicate.

Another method for chemically gelling of colloidal silica-based binder vehicles is disclosed in Yates U.S. Pat. No. 3,920,578. The Yates patent first points out in the "Background Of The Invention" section the relatively weak bond between layers of colloidal silica sols gelled by adjusting the pH of the sol and by simultaneously adding a neutral salt such as magnesium chloride to enhance destabilization. The Yates patent then discloses a composition and method which is said to improve or reinforce the relatively weak junction points. In particular, the Yates patent discloses a method in which a small amount of water-soluble alkaline ionic silicate is admixed with a colloidal amorphous silica aquasol and the resulting composition is adjusted to a pH of from 5 to 9.5. However, by employing alkaline ionic silicate to set the colloidal silica sol, a relatively high amount of alkaline material is introduced into the investment casting shell, which can reduce the refractoriness of the shell and therefore limit its utility for casting of metals which require high melting temperatures.

Other patents employ processes in which, for example, a pattern is alternately dipped into two refractory compositions, the second of which causes gellation of the coating resulting from such dips. These processes thus proceed via a relatively quick chemical gelling step without an intermediate drying step between the alternate dips of the two refractory compositions. Because gels are formed, it is believed the shells resulting from these process will be subject to a number of disadvantages, for example, contamination of the second refractory composition by the outermost coat of the first refractory composition, slow and perhaps reversible drying of the gel, and shrinkage and consequent cracking of the shells. Examples of such patents include Szabo U.S. Pat. No. 4,019,559; Shaul U.S. Pat. No. 2,806,270; Emblem et al. U.S. Pat. No. 3,270,382; Emblem et al. U.S. Pat. No. 3,292,220; Moore U.S. Pat. No. 3,748,156; Beyer et al. U.S. Pat. No. 3,751,276; Moore U.S. Pat. No. 3,752,679; Moore U.S. Pat. No. 3,752,680; Moore U.S. Pat. No. 3,752,681; Moore U.S. Pat. No. 3,752,689; Moore U.S. Pat. No. 3,754,945; Moore U.S. Pat. No. 3,754,946; Moore U.S. Pat. No. 3,767,458; Beyer et al. U.S. Pat. No. 3,859,153; Moore et al., U.S. Pat. No. 3,860,476; Beyer et al. U.S. Pat. No. 3,878,034; Moore U.S. Pat. No. 3,894,572; Moore U.S. Pat. No. 3,894,572; Taylor U.S. Pat. No. 3,898,313; Emblem et al. U.S. Pat. No. 4,068,701; British Patent Specification No. 731,445; and British Patent Specification No. 1,031,778. Taylor U.S. Pat. No. 3,898,313 is the only one believed to disclose the use of an acidic hybrid binder composition.

It would be highly desirable to provide a refractory coating composition which can be set irreversibly and fairly quickly to a hard coating suitable for an investment casting shell, which will not rewet or soften upon application of a subsequent coat, which minimize shrinkage and its consequent cracks, and which can provide an investment casting shell which can be employed in connection with casting of high temperature melting metals or alloys.

SUMMARY OF THE INVENTION

It has now been found that a refractory laminate composition suitable for use as an investment casting shell (and other uses as described below) having excellent refractory characteristics can be provided by a process comprising the steps of providing an acidic hybrid binder composition; providing a basic colloidal silica sol composition; coating the surface with the acidic hybrid binder composition and the colloidal silica sol composition so that each colloidal silica sol composition coat contacts an acidic hybrid binder composition coat to form alternating layers of the acidic hybrid binder composition and the colloidal silica sol composition; and drying each acidic hybrid binder composition layer and each colloidal silica sol layer prior to coating with the alternating layer to a sufficient hardness such that lift-off of the applied coatings from the surface is inhibited when a subsequent coating step is performed. These coatings can be formed on the surface, which is preferably a wax pattern, for example, by alternately dipping the pattern into the acidic hybrid binder composition and the colloidal silica sol composition, with stuccoing of the layers with refractory aggregate and drying of each coat between such coating steps.

The invention also provides a refractory laminate composition comprising a plurality of layers of hardened acidic hybrid binder composition alternating with a plurality of layers of hardened basic colloidal silica sol composition.

In the process and product of the invention, the basic colloidal silica sol and acidic hybrid binder composition coats have been found to act on each other in a manner believed different from normal chemical gelling reactions. By drying prior to application of an alternate coat of either composition, a refractory laminate composition is provided in which the underlying layers are hard and do not "re-gell" or soften upon application of a subsequent coat or by dipping into water. Thus, the process of the invention provides excellent hardening of the refractory laminate composition, e.g., a shell mold. Moreover, shrinkage problems and consequent cracking of a refractory laminate are alleviated with the present invention. Further, the present process reduces the drying time in comparison to the use of colloidal silica sol or of aqueous based hybrid binder as the sole coating material. In particular, the hardening reaction in the process of the invention between dips is generally essentially complete within about one to two hours (preferably about 4 hours), thus, reducing drastically the time necessary between dips. For example, the time between dips employing conventional techniques employing colloidal silica sol alone or aqueous based hybrid binder alone can run anywhere from two hours for primary coatings all the way to 72 hours for some of the back-up coats.

Furthermore, because extensive drying time between coats is not necessary with the process of the invention, the chances of lost precision are greatly reduced. In particular, the maintenance over long periods of time of restricted temperature and humidity conditions for drying so as to avoid expansion or contraction of the wax pattern are drastically reduced with the process of the invention. Also, the hardening of the shell in the present invention is more pedictable and more controllable than with the conventional techniques employing collidal silica sol or hybrid binder alone. Moreover, because extensive drying is not required, the coated patterns are easier to handle more quickly. In addition, costs can be greatly reduced because there is less need for extensive or exotic drying equipment, or the space or labor employed in connection with such long drying techniques.

Still further, by avoiding the addition of any separate chemical as a setting agent, the purity of the system, e.g., as a refractory shell mold is maintained. Thus, refractory shell mold of the invention can be produced having excellent refractory properties. For example, the refractory shell mold of the invention can be prepared with relatively low alkali metal and alkaline earth metal content, which materials can act as fluxing agents in a resultant refractory shell and which can therefore reduce the melting point of the refractory shell. Thus, the refractory laminate composition of the invention maintains a high degree of refractoriness and can therefore be utilized with very high temperatures, i.e., molten steels or alloys, and/or with thick metal sections.

DETAILED DESCRIPTION OF THE INVENTION

Any conventional basic colloidal silica sol composition can be employed in the process of the invention. Typically, the basic colloidal silica sol has a pH of above about 9, preferably from about 9.5 to 10.5. Preferably, the colloidal silica sol is aqueous based and contains from about 15 to about 60% by weight $SiO_2$, more preferably, from about 25 to about 50% by weight, and typically about 30% by weight $SiO_2$. Examples of suitable basic colloidal silica sols for use in the process of the invention include for example the basic colloidal silica sols sold under the tradenames Ludox ® available from E. I. duPont, Nalcoag ® by Nalco Chemical Company, and Nyacol ® by the Nyacol Chemical Division of P.Q. Corporation. A preferred basic colloidal silica sol used in the present invention is a colloidal silica sol having a pH of about 10.3 and having a $SiO_2$ content of about 30% by weight, and having an average size of from about 5 to about 30 nanometers, e.g., Nyacol ® 830 available from Nyacol Chemical (division of P.Q. Corporation). Also, suitable is Nyacol ® 2050 having an $SiO_2$ content of about 50% by weight.

The basic colloidal silica sol coating is preferably employed in the present invention with refractory filler therein, i.e., it is applied as a slurry which conventionally contains refractory filler in the colloidal silica sol. The amount or ratio of refractory is conventional in the art depending on a number of factors including the refractory composition, the coat being applied and the shell usage. Typically, a weight ratio of refractory filler to colloidal silica sol of from about 1:1 to about 4:1 can be employed.

The acidic hybrid binder composition employed in the present invention can employ any of the conventional hybrid systems of hydrolyzed alkyl silicate and colloidal silica as disclosed in the art. Examples of suitable hybrid binder compositions include those disclosed in Wales U.S. Pat. No. 3,961,968, Wales et al. U.S. Pat. No. 4,289,803 and British Pat. No. 1,309,915, e.g., a hybrid binder sold under the tradename Silester A-1 binder by Monsanto (Europe). The hybrid binder compositions disclosed in our copending U.S. application Ser. No. 525,423 filed Aug. 22, 1983 are also suitable for use in the present invention.

The acidic hybrid binder composition preferably comprises colloidal silica, a liquid material containing Si—OH groups and a solvent, which solvent is capable of solubilizing the liquid material and the colloidal silica. The liquid material and the colloidal silica are preferably present in a ratio by weight of from about 1:12 to about 75:1, respectively, and the liquid material preferably has at least about 20% by weight of $SiO_2$ and the colloidal silica preferably has at least about 15% by weight of $SiO_2$. A preferred class of hybrid binder compositions are those comprising of from about 5 to about 40% of ethyl silicate that has been hydrated, the ethyl silicate containing from about 20% to about 60% by weight $SiO_2$; from about 5 to about 40% by weight acidic colloidal silica containing from about 15 to about 60% by weight of $SiO_2$; and from about 20 to about 55% by weight of a solvent selected from methanol, ethanol, isopropyl alcohol, diethylene glycol monoethyl ether, propylene glycol monomethyl ether, propylene glycol monopropyl ether, ethylene glycol monoethyl ether, ethylene glycol monomethyl ether, propylene glycol monoethyl ether, ethylene glycol monopropyl ether or mixtures thereof. The hybrid binder composition preferably further includes at least one aprotic, non-ionic, non-metallic, organic compound which contains at least one element selected from the group consisting of P, S, B, N and mixtures thereof as is disclosed in our copending U.S. application Ser. No. 525,423 filed Aug. 22, 1983. Preferably, such aprotic, non-ionic, non-metallic organic compound comprises dimethyl methyl phosphonate. The dimethyl methyl phosphonate is preferably contained in the hybrid binder composition in an amount of from about 0.5 to about 12% by weight. Preferred hybrid binder compositions are those disclosed in our copending U.S. application Ser. No. 525,423 filed Aug. 22, 1983, the disclosure of which is incorporated herein by reference for its description of suitable hybrid binder compositions for use in the present invention.

The hybrid binder slurry composition employed in the present invention also preferably includes refractory filler particles therein to provide a refractory slurry as is conventional in the art for preparation of investment casting shells. Typically, such refractory filler particles are included in an acidic hybrid binder slurry composition in a weight ratio to the binder composition itself of from about 1:1 to about 5:1, preferably from about 2:1 to about 4:1.

Suitable refractory particles for either the basic colloidal silica sol slurry or acidic hybrid binder slurry include refractory flours such as zircon, zirconia, fused silica, quartz, other siliceous refractories, tabular alumina, and aluminosilicate, e.g. Molcoa or Mulgrain refractory from C.E. Minerals, Inc., Molochite refractory from E.C.C. International Ceramics Div. (England), or Kyanite refractory from Kyanite Mining Co. Typically, the refractory particles used in making a primary slurry are finer than in the subsequent coating slurries, with the outer slurry coatings having more coarse particles. Suitable particles for the primary coat have a size in the range of from about 400 to about 200 mesh. The outer slurry coating can, for example, employ particles having a size in the range of from about 325 to about 40 mesh.

The slurries of the acidic hybrid binder composition and the basic colloidal silica sol composition can be prepared by conventional techniques. For example, the slurry can be prepared by simply adding the desired refractory particles, such as zircon, fused silica or the like used in that particular foundry, mixed with the appropriate acidic hybrid binder or basic colloidal silica sol composition. The viscosity of the slurry composition can be adjusted again as is conventional in the art to provide the coating characteristics desired by that particular foundry. These viscosity characteristics vary from foundry to foundry depending upon a great number of factors, including the metal or alloy being employed as the casting, the size and the complexity of the casting structure or configuration, the refractory material employed, any necessary handling of the shells during processing, the shrink tolerances and precision required of the casting, and the like. These same factors also determine the number of coats employed. Typically, the viscosity is varied by changing the ratio of the refractory powder to the liquid hybrid binder or liquid colloidal silica sol in the slurry composition. Generally, more liquid hybrid binder or liquid colloidal silica sol in the slurry composition will provide lower viscosities. Higher viscosity slurry compositions are provided by higher solids content and by the particle size of the refractory. Again, all of these factors are conventional in the art for preparing such refractory slurries.

The acidic hybrid binder composition and/or the colloidal silica sol composition may also include a non-toxic wetting agent. Any conventional non-toxic wetting agent can be employed in the invention. Suitable wetting agents include Pluronic L92, 3M FC128, Union Carbide's Tergitol TMN6, 15S7, and L7607 (silicone based), and Iconol DA4 and DA6.

The individual coating or dipping steps employed in the present invention can be performed in a manner conventional in the art. Such coating steps are well-known in the "lost wax" process as described in our co-pending application Ser. No. 525,423 filed Aug. 22, 1983, the disclosure of which is incorporated herein by reference for its description of the preparation of investment casting molds and the "lost wax" process. Normally, the coating takes place by dip coating a pattern structure, e.g., an investment wax pattern as is conventional in the art. However, the coats of the acid hybrid binder composition and/or basic colloidal silica sol composition can be applied in any other conventional or appropriate manner, e.g., by spraying, painting, swabbing, etc. onto the desired surface.

In this latter regard, the underlying surface need not be a wax pattern. The refractory laminate composition of the invention can be used in any application where the refractory characteristics of such laminate composition are useful. For example, the refractory composition of the invention can also be used to coat expanded polystyrene, metal, plastics, any conventional mold substances that can be burnt out, etc.

In performing the process of the invention, the desired surface, such as a wax pattern, can be coated first with either the hybrid binder slurry composition or the colloidal silica sol composition. In a preferred embodiment of the invention, the pattern structure is coated first with a colloidal silica sol slurry composition.

In a typical performance of the process of the invention, a surface, e.g., an investment pattern wax, is first dipped into a colloidal silica sol primary slurry. A stucco is then applied to the primary coating. A typical stucco is a larger size aggregate than that of the refractory particles in the primary slurry coat. This primary coating is allowed to dry about two hours or more, if desired.

The surface with the dried primary coat thereon is then dipped into the alternate coating composition. Namely, if the primary coating is a basic colloidal silica sol slurry, the second coating will be an acidic hybrid binder slurry. This second coating is allowed to dry and harden typically for about two hours or more, preferably 4 hours or more. The coatings are allowed to dry for a time sufficient to harden the coating so that lift-off of the underlying coatings from the surface is inhibited or will not occur when the subsequent coating step is performed. This is generally 4 hours between coats. In a like manner, the additional coatings of the acidic hybrid binder slurry and the basic colloidal silica sol slurry are applied with time between coatings to allow sufficient drying between the coatings to provide the desired setting or hardening action. Again, stuccos of refractory aggregate are preferably applied to the applied hybrid binder and colloidal silica sol coatings prior to drying and hardening thereof.

Again, many of the conventional refractory stucco aggregates well known in the art in connection with particular hybrid binder compositions and colloidal silica sol compositions can be employed in the present invention. Suitable refractory stucco aggregate materials include the same materials as described above in connection with the refractory fillers to prepare the slurries but in a coarser grain up to about $\frac{1}{4}$ inch. Typically, finer aggregate is used in connection with the primary and inner coats with larger aggregate being employed on the outer coats. Typically, these refractory stucco aggregate materials have a size in the range of from about 70 mesh screen to about $\frac{1}{8}$ mesh screen again as is conventional in the art.

Not all applications of the invention require refractory filler and/or stuccoing with refractory material (aggregate). In making investment casting molds, it is preferred to employ slurries of the acidic hybrid binder composition and the basic colloidal silica sol composition and to stucco between drying steps. However, this may not be necessary or desirable for other applications of the invention such as slat resistant paints, washes and coatings for sand molds, coatings or metals for high temperature applications, coatings on organic shapes for preservation thereof, etc.

The hybrid binder coating and the colloidal silica sol coating do not necessarily have to be alternate. It is necessary, however, that each hybrid binder layer be adjacent to a colloidal silica sol layer and vice versa.

Thus, once a primary coating is applied, two coatings of the alternate composition can be employed to provide the alternate layer, followed by, for example, two coatings of the same composition as the primary coat. Subsequent coatings can be applied in a similar fashion with stuccoing preferably after application of each of the hybrid binder coats and colloidal silica sol coats as described above.

As discussed above, each layer of hybrid binder composition and each layer of colloidal silica sol composition is dried prior to a subsequent coating step with the alternate coating composition. In this drying step, the coated layer can be air dried in most cases where controlled temperature and humidity conditions are present. Normally, the coats are dried until the layer is dry to the touch. Preferably, the layer is dried until it is scratch-resistant to pressure from, for example, a thumb nail. Normally, the layers are allowed to dry for more than about one hour, preferably two hours or more, more preferably about 4 hours, under such controlled drying conditions. In the drying step employed in the invention, about 40% or more of the total volatile material of the applied coating composition, preferably more than 60% to 80% by weight, is evaporated prior to application of the next alternate coating composition.

Timing of subsequent dips does not depend on previous dip times. That is, the second coat can be applied after perhaps 2 hours, while the third coat can be applied after ten hours and the fourth and subsequent coats applied after drying periods selected by the operator to suit his schedule. Overdrying with conventional multiple layers of colloidal silica sol slurries can present a problem due to shrinkage and consequent cracking. Such overdrying with the sequential coating method of the invention has not proven to be a problem.

Although we do not want to be bound by theory to describe the results obtained with the present invention, it is believed that the process of the present invention provides a different primary mechanism of bond formation from the gel bond which results from the conventional dipping methods in the prior art employing (1) multiple coats of dried colloidal silica sol; or (2) chemically gelled coats. In the case of gel bonding, this has been described by Iler, *The Chemistry of Silica,* John Wiley and Sons (1979), as a loose net type bonding where the various colloidal particles in a colloidal silica sol are joined together much as pearls in a necklace are joined together with crosslinking into a three-dimensional network. Between the crosslinks are pockets which can hold solid particles (which represent the solid phase of a slurry) as well as liquid. This type of gel bonding has only point contact between the colloidal particles and therefore lacks strength, compactness and cohesiveness. Because of the network of colloidal strings, evaporation from the inside of this gel is inhibited. As the drying progresses in a gel bond, shrinkage can occur with moisture leaving the body of the gel and many of the initial bonds are stressed, again according to Iler. This can lead to cracks forming in the resulting refractory compositions. With prolonged removal of moisture from the gel, additional contact points are made and finally strong bonds are achieved, but time is required in a gel bond to establish these kind of contact points. The gel bonding remains water sensitive for a substantial period of time even though appearing to be quite dry. The bond, if exposed to moisture, can decripitate to a non-bonded state.

By contrast, it is believed that in the present invention the primary mechanism of bonding is a precipitate or deposition type bonding. A gel bond does not occur because the underlying layers are hardened. It is postulated that the colloidal silica particles migrate to the surface of the solid phase, i.e., to the underlying hardened coatings or to the particles in the slurry, avoiding any substantial gel formation. By avoiding gel formation, the moisture evaporation is not inhibited and therefore drying is not restricted. By depositing the colloidal silica directly on the surface of the solid phase, the silica particles are quickly located at the desired point of bonding, thereby causing an irreversible setting of the coating layers. By irreversible, we mean that a subsequent coating does not substantially soften the prior set coatings. Also, because this is a type movement (which it is postulated as being driven by electrostatic forces), the bonding becomes irreversible and therefore not subject to further moisture intrusion as can occur with gels. Moisture removal is required with this type of deposition in order to get the concentrations of colloidal silica sol high enough for the deposition to occur.

Figure 1:
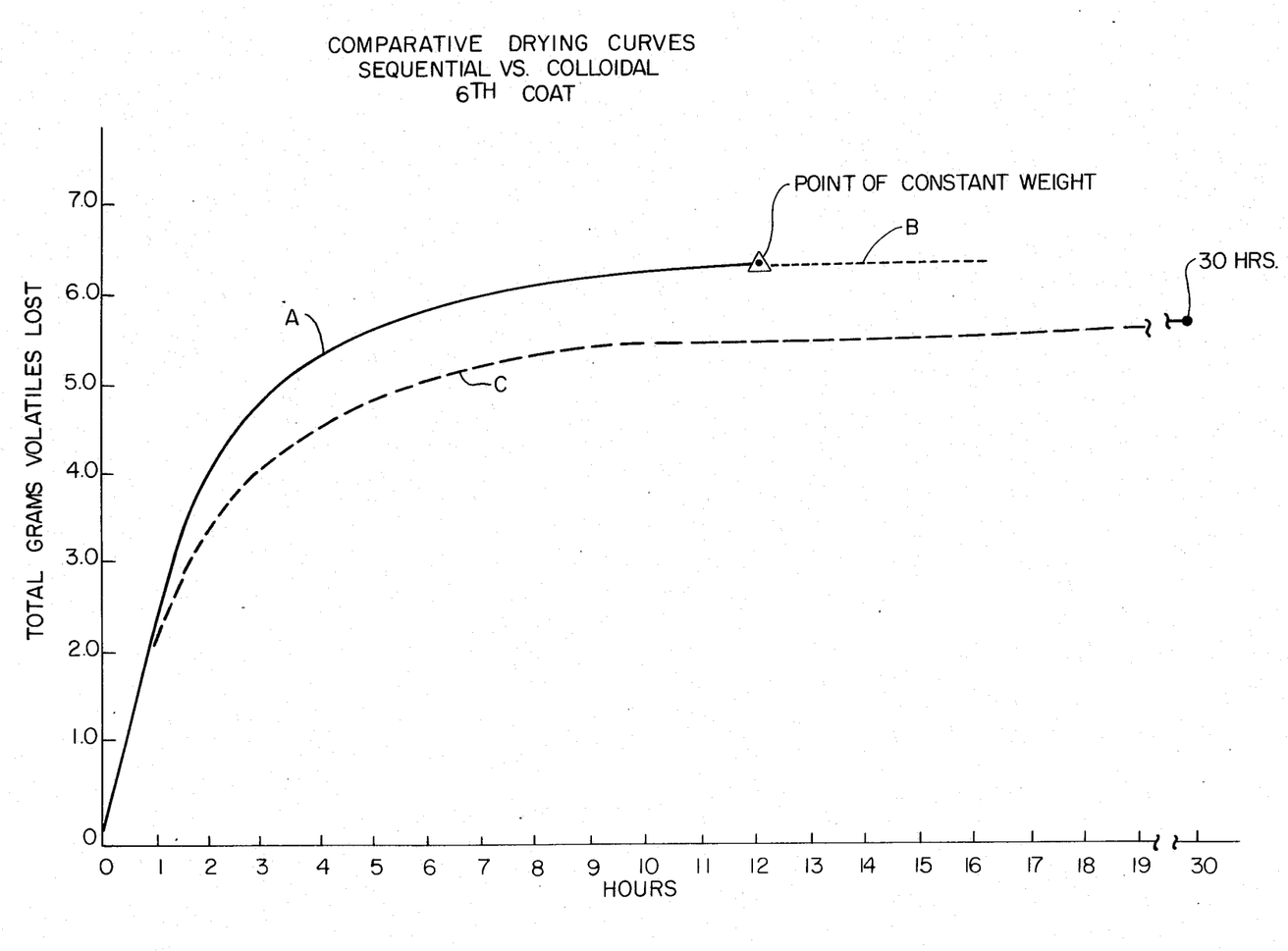
The FIGURE is a graphical illustration comparing the drying characteristics of a shell prepared with a colloidal silica sol composition as the sixth and outer coat in a sequential coating process in accordance with the invention and of a shell prepared with a colloidal silica sol composition as the sixth and outer coat in a process employing colloidal silica sol for all such coats.

The differences between the results obtained with the process of the present invention employing alternate layers of acidic hybrid binder composition and basic colloidal silica sol composition (sequential process) vis-a-vis a process employing only basic colloidal silica sol composition for all coats (colloidal sol process) are best illustrated with reference to the Figure. The Figure relates to specific results obtained as explained in Examples 6 and 7 below, but has been found in our experience to be generally valid. The Figure shows that:

(1) although after about 1 hour, about 40% of volatiles are removed from the sixth coat in both processes, the sequential process provides a sufficiently dry sixth coat to avoid lift-off of the underlying layers upon application of the next coat, whereas the sixth coat from the colloidal sol process cannot be recoated without lift-off occuring;

(2) the sequential process provides a higher rate of volatile loss than the colloidal sol process;

(3) the sequential process provides a higher total amount of volatile material lost than the colloidal sol process;

(4) the sequential process provides a relatively constant end weight for the sixth coat after about 12–14 hours; and (5) the colloidal process does not provide a constant end weight for the sixth coat even after about 30 hours (and, in fact, the weight was found to vary even after 48 hours).

All of these results are consistant with a different bonding mechanism being achieved with the sequential process than with the colloidal silica sol process and indicate a deposition type mechanism rather than a gel bonding mechanism.

Coat lift can be defined as the condition occurring when a portion of a refractory laminate becomes unbonded from the surface, e.g., a wax surface, and separates from such surface resulting in a void between the surface and refractory laminate. This lift-off makes the mold cavity created by the refractory laminate larger than desired. Such lift-off can occur when moisture from the next coating composition permeates the previously deposited coats to soften the laminate. The bond between the first coat and the surface, e.g., wax, is weakened by the intrusive moisture, allowing the coat weight to pull the laminate away from such surface. In the extreme case, the laminate falls away completely from the laminate surface by becoming totally detached. In minor cases, when a laminate is employed as an investment casting mold, the lift-off adds to the mold cavity resulting in a bulged metal casting. Lift-off is generally associated with the weakening of bond strengths. With the present invention employing proper drying between alternate coats, sufficient hardness is obtained so that coat lift is inhibited.

Once the desired number of coats have been applied as is necessary for the particular application contemplated, any pattern can be removed. In the case of an investment wax pattern, the wax is melted, e.g., by a flash dewaxing furnace, a steam autoclave or a boiling solvent bath, as is conventional in the art.

The refractory laminates of the invention can be fired to increase their strength to a fired ceramic bond. Typically, the refractory laminate composition of the invention can be fired at temperatures of from about 1000° to 2000° F. as is conventional. The fired refractory laminate can then be employed, for example, in the casting of molten metal or alloys again in a conventional manner.

The following examples are intended to illustrate, but not to limit, the process and product of the invention.

EXAMPLE 1

A wax pattern in the form of a bar was coated in the following manner:

The colloidal silica composition employed in such coatings had an $SiO_2$ content of about 30% by weight and a pH of about 10.3 (Nyacol® 1430). The hybrid binder composition employed was prepared in the general procedure as described in Example No. 5 of our co-pending U.S. application Ser. No. 525,423 and included about 38% by weight of propylene glycol monomethyl ether, about 8% by weight of hydrated ethyl silicate 40, about 5% by weight of dimethyl methyl phosphonate, with the balance being acidic colloidal silica having 34% by weight $SiO_2$ content of average 14–20 nanometer particle size. The overall $SiO_2$ content of the hybrid binder composition was about 22% by weight.

The wax bar was first dipped into a primary slurry of the basic colloidal silica sol containing zircon flour of about 200 mesh in a weight ratio of about 4:1 of zircon flour to colloidal silica binder composition. The resulting slurry provided a viscosity of about 30 seconds on a No. 5 Zahn cup. The resulting coating was then stuccoed with a zircon aggregate of about 70 mesh (duPont calcined zircon sand from Stark, Fla.). This coating was allowed to air dry for about an hour and produced a hard set coating.

The coated wax bar was then dipped into a hybrid binder composition as discussed above containing fused silica flour of about 200 mesh in a weight ratio of about 1:1 of fused silica to hybrid binder composition. The resulting hybrid binder slurry provided a viscosity of about 14 seconds on a No. 5 Zahn cup. This hybrid binder coating was stuccoed with aluminosilicate aggregate of about 70 mesh. The resulting coating was allowed to air dry for about an hour and provided a set, hard coating.

The coated wax pattern with the two coats as described above was then sequentially dipped and stuccoed employing the following either the colloidal silica or hybrid binder slurries as indicated below in Table 1. The time between coats and the viscosity of the slurries are indicated in Table 1 below.

The shell produced by this method set stone hard and was ready for autoclaving for dewaxing in 15½ hours with 9 coats.

TABLE 1

| Coating Composition | Refractory Flour | Approximate Weight Ratio of Coating Composition to Flour | Viscosity of Slurry (with No. 5 Zahn cup) | Stuccoing Aggregate | Approximate Time to Next Coat |
|---|---|---|---|---|---|
| 3. Colloidal | Fused silica (200 mesh) | 1:1 | 18 sec. | alumino-silicate (70 mesh) | 1 hr. |
| 4. Hybrid | Fused silica (120 mesh) | 1:1 | 7 sec. | alumino-silicate (30 mesh) | 2 hrs. |
| 5. Colloidal | Fused silica (120 mesh) | 1:1 | 12 sec. | alumino-silicate (30 mesh) | 1 hr. |
| 6. Hybrid | Fused silica (120 mesh) | 1:1 | 7 sec. | alumino-silicate (30 mesh) | 1 hr. |
| 7. Colloidal | Fused silica (120 mesh) | 1:1 | 12 sec. | alumino-silicate (30 mesh) | 1 hr. |
| 8. Hybrid | Fused silica (120 mesh) | 1:1 | 7 sec. | alumino-silicate (30 mesh) | 1 hr. |
| 9. Colloidal | Fused silica (120 mesh) | 1:1 | 12 sec. | alumino-silicate (30 mesh) | 1 hr. |

EXAMPLE 2

The colloidal silica composition and hybrid binder composition as described in Example 1 above were again employed to provide a refractory laminate on a wax pattern in the shape of an 18 inch long sprue with patterns attached. Different stuccos were in some instances employed as indicated below in Table 2 with the indicated coating sequence.

TABLE 2

| Coating Composition | Refractory Flour | Approximate Weight Ratio of Coating Composition to Flour | Stuccoing Aggregate | Approximate Time to Next Coat |
|---|---|---|---|---|
| 1. Colloidal | Zircon (200 mesh) | 4:1 | Zircon sand | 1 hr. |
| 2. Hybrid | Fused silica (200 mesh) | 1:1 | Fused silica (about 70 mesh) | 1 hr. |
| 3. Colloidal | Fused silica (200 mesh) | 1:1 | Fused silica (about 70 mesh) | 1 hr. |
| 4. Hybrid | Fused silica (120 mesh) | 1:1 | Fused silica (about 30 mesh) | 1 hr. |
| 5. Colloidal | Fused silica (120 mesh) | 1:1 | Fused silica (about 30 mesh) | 1 hr. |
| 6. Hybrid | Fused silica (120 mesh) | 1:1 | Fused silica (about 30 mesh) | 1 hr. |
| 7. Colloidal | Fused silica (120 mesh) | 1:1 | Fused silica (about 30 mesh) | 1¼ hrs. |
| 8. Hybrid | Fused silica (120 mesh) | 1:1 | Fused silica (about 30 mesh) | 1¼ hrs. |
| 9. Colloidal | Fused silica (120 mesh) | 1:1 | Fused silica (about 30 mesh) | 1¼ hrs. |

Again, a shell was provided which dried stone hard and was ready to dewax in 24 hours. After dewaxing, the ceramic shell rang like a bell, indicating a shell with no cracks. Molten stainless steel was poured into the shell and a good quality casting was produced.

EXAMPLE 3

A wax pattern in the form of a bar was coated in the following manner:

Two different colloidal silica sol compositions were employed. The first (sol composition No. 1) was Nyacol ® 830 which has an $SiO_2$ content of about 30% by weight and a pH of about 10.3. The second (sol composition No. 2) was Nyacol ® 2050 which has an $SiO_2$ content of about 50% by weight and a pH of about 10.5. A colloidal silica sol slurry (CS-1) of sol composition No. 1 with Molochite (400 ml. of sol and 600 grams of Molochite 200 mesh) was also prepared.

The hybrid binder composition as described in Example 1 above was employed in preparing a series of hybrid binder slurry compositions. This hybrid binder was prepared into four hybrid binder slurry compositions referred to as HS-1, HS-2, HS-3 and HS-4, respectively, in Table 3 below. HS-1 was prepared by mixing 500 ml. of the above hybrid binder with sufficient zircon (200 mesh) to provide the viscosity indicated in column 3 of Table 3 below. HS-2 was prepared by mixing 500 ml. of the above hybrid binder with Kyanite (100 mesh) to provide the viscosity indicated in column 3 of Table 3. HS-3 was prepared by first mixing 335 ml. of the above hybrid binder composition with 165 ml. of an acidic colloidal silica sol having an $SiO_2$ content of about 34% (Nalcoag 1034A from Nalco Chemical Company) and then mixing therewith a sufficient amount of Kyanite (100 mesh) to provide the viscosity indicated in column 3 of Table 3. HS-4 was prepared by first mixing 250 ml. of the above hybrid binder composition with 250 ml. of Nalcoag 1034A and then mixing therewith a sufficient amount of Kyanite (100 mesh) to provide the viscosity indicated in column 3 of Table 3.

In some instances, a different primary slurry coat was employed from the subsequent backup slurry coats. HS-1 was employed for these primary coats as indicated in column 8 of Table 3 with the viscosity being adjusted to that indicated in column 9 by varying the zircon content.

Seventeen (17) wax patterns were coated in the manner indicated in column 1 with the colloidal silica sol composition or slurry thereof and with the hybrid binder slurry as indicated in columns 2, 4 and 5. "Sequential" in Table 3 means that after the indicated primary coat(s), the wax pattern was next dipped alternately into the indicated hybrid slurry (column 1) and colloidal silica sol or slurry thereof as indicated in Table 3 for the respective Test No. When a hybrid primary coat was employed, the next coat was the colloidal sol or slurry as indicated in Table 3. When a colloidal silica sol slurry primary coat was the first coat, the next coat was hybrid binder slurry as indicated in Table 3. In all cases each slurry coat was stuccoed prior to drying thereof. The stuccoing sequence was zircon for the first slurry coat, Molcoa (an aluminosilicate from C. E. Minerals) (70 mesh) for the second and third slurry coats, and Molcoa (30 mesh) for the remaining slurry coats. Six such slurry coats were applied with the seventh coat being a seal coat of slurry material which would have formed the seventh coat in the sequence but without stucco. In all instances (except as indicated in Table 3), the drying time between each of the coats was about 2-3 hours. The resulting coated patterns provided refractory laminate compositions which had no lift-off from the wax pattern and which had varying modulus of rupture strengths of from about 300 grams to about 1200 grams, depending on the different process parameters, including viscosity and the refractory flours employed.

TABLE 3

| Test No. | Col. 1 Method of Dipping | Col. 2 HS No. | Col. 3 HS No. Viscosity | Col. 4 Colloidal Silica Sol Employed As Hardener |
|---|---|---|---|---|
| 1 | Sequential (Sl./Hard.) | HS-2 | 6 | 2050 |
| 2 | Sequential (Sl./Hard.) | HS-2 | 10 | 830 |
| 3 | Sequential (Sl./Hard.) | HS-1 | 16 | 2050 |
| 4 | Sequential (Sl./Hard.) | HS-2 | 10 | 2050 |
| 5 | Sequential (Sl./Hard.) | HS-3 | 18 | 830 |
| 6 | Sequential (Sl./Hard.) | HS-3 | 18 | 830 |
| 7 | Sequential (Sl./Hard.) | HS-3 | 18 | 2050 |
| 8 | Sequential (Sl./Hard.) | HS-3 | 30 | 2050 |
| 9 | Sequential (Sl./Hard.) | HS-3 | 30 | 2050 |
| 10 | Sequential (Sl./Hard.) | HS-2 | 30 | 2050 |
| 11 | Sequential (Sl./Hard.) | HS-4 | 30 | 2050 |
| 12 | Sequential (Sl./Hard.) | HS-5 | 30 | 2050 |
| 13 | Sequential (Sl./Sl.) | HS-2 | 6 | — |
| 14 | Sequential (Sl./Sl.) | HS-2 | 10 | — |
| 15 | Sequential (Sl./Sl.) | HS-2 | 9 | — |
| 16 | Sequential (Sl./Sl.) | HS-2 | 9 | — |

| Test No. | Col. 5 Colloidal Silica Slurry No. | Col. 6 Colloidal Silica Viscosity | Col. 7 Prewet With | Col. 8 No. of Coats | Col. 9 Primary Coats Viscosity |
|---|---|---|---|---|---|
| 1 | — | — | — | — | — |
| 2 | — | — | — | — | — |
| 3 | — | — | — | n/a | 22 |
| 4 | — | — | — | 2 | 13 |
| 5 | — | — | — | 2 | 20 |
| 6 | — | — | — | 2 | 20 |
| 7 | — | — | — | 2 | 20 |
| 8 | — | — | — | 2 | 20 |
| 9 | — | — | Hybrid binder | 2 | 28 |
| 10 | — | — | — | 2 | 28 |
| 11 | — | — | Hybrid binder | 2 | 23 |
| 12 | — | — | Hybrid binder | 2 | 23 |
| 13 | — | — | Hybrid binder | 2 | 23 |
| 14 | CS-1 | 6 | — | — | — |
| 15 | CS-1 | — | — | 1 | 22 |
| 16 | CS-1 | 10 | — | 1 | 13 |
| 17 | CS-1 | 10 | — | — | — |

EXAMPLE 4

A basic colloidal silica sol slurry composition was prepared by placing 500 ml of colloidal silica sol (having about 30% $SiO_2$ by weight and an average colloidal diameter of about 8 nanometers) into a mixing tank containing a stirrer. The stirrer was turned on and 1,000 g. of molochite (200 mesh) and 1 ml. of Kodak photoflow 200 were added. This provided a thin slurry having a viscosity of 14 seconds, No. 5 Zahn cup.

An acidic hybrid binder slurry composition was prepared by mixing 8.4 parts by weight ethyl silicate 40, 41.0 parts by weight propylene glycol monomethyl ether and 0.1 parts by weight HCl. To this mixture, 50.5 parts by weight of an acid colloidal silica sol (having about 34% $SiO_2$ and an average colloidal diameter of about 20 nanometers) was added slowly with stirring.

Five hundred ml of the resultant hybrid binder composition was placed in a mixing tank and 680 g. of fused silica (Ranko-Fine) was added with stirring. The resulting slurry had a viscosity of 11 seconds, No. 5 Zahn cup.

A wax pattern was washed with a Genesolve D (a fluorocarbon produced by Allied Chemical Company) and then initially coated with the colloidal silica sol slurry described above. The coated pattern was stuccoed with fine fused silica. After about three hours of drying at room temperature, the coated pattern was dipped into the hybrid slurry and stuccoed with fine fused silica. The coating with the colloidal silica sol slurry and the hybrid binder slurry were alternated so as to provide a total of 6 coats (3 of colloidal silica sol slurry and 3 of the hybrid binder slurry with the sixth coat being hybrid binder slurry). The average drying time between coats was about 4 hours. A seal coat of the colloidal silica sol slurry was then applied without stucco.

The resulting refractory composition gave the same appearance as with other refractory laminates from the sequential process of the invention as described in Examples 5 and 7 below. Moreover, the coatings appeared to dry in the same manner as with the refractory compositions of Examples 5 and 7.

EXAMPLE 5

A sequential coating process as carried out by employing 600 ml of the hybrid binder composition as described in Example 1 above. To this hybrid binder composition, 1000 g of kyanite (about 100 mesh) was added with constant stirring to provide the hybrid binder slurry. The colloidal silica sol slurry composition employed in this process was that described in Example 4 above.

The hybrid binder slurry and colloidal silica sol slurry compositions were then used to apply alternate coatings thereof to a wax pattern, with the colloidal silica sol slurry being applied as the first coat. The dipping sequence is set forth below in Table 4, with the stucco indicated being applied prior to drying of each coat.

TABLE 4

| Slurry | Approximate Time Between Coats For Drying | Stucco |
| --- | --- | --- |
| Colloidal | — | Zircon fluor |
| Hybrid | 2 hours | Molcoa[1] (70 mesh) |
| Colloidal | 4 hours | Molcoa[1] (30 mesh) |
| Hybrid | 4 hours | Molcoa[1] (30 mesh) |
| Colloidal | 4 hours | Molcoa[1] (30 mesh) |
| Hybrid | 9¾ hours | Molcoa[1] (30 mesh) |

[1]An aluminosilicate from C.E. Minerals.

After application of the sixth coat and stuccoing thereof, the coated pattern was placed on an Ohaus Brainweigh B-500 electronic balance employing an aluminum stand with a collection pan below the coated pattern to collect any of the laminate composition which might drip off. The weight of the coated pattern was then recorded with respect to time. The weight loss represented the volatile components and it dried to a constant weight loss of about 7 grams after less than 24 hours.

EXAMPLE 6

The procedure of Example 5 was repeated, except that the colloidal silica sol slurry was used to apply all six coats, i.e., no hybrid binder slurry was employed. The following coating sequence was employed, again with the applied coating being stuccoed prior to drying thereof with the indicated stucco material:

TABLE 5

| Slurry | Approximate Time Between Coats For Drying | Stucco |
| --- | --- | --- |
| Colloidal | — | Zircon fluor |
| Colloidal | 2 hours | Molcoa[1] (70 mesh) |
| Colloidal | 4 hours | Molcoa[1] (30 mesh) |
| Colloidal | 10 hours | Molcoa[1] (30 mesh) |
| Colloidal | 11 hours | Molcoa[1] (30 mesh) |
| Colloidal | 12 hours | Molcoa[1] (30 mesh) |

[1]An aluminosilicate from C.E. Minerals.

As in Example 5 above, after the sixth coat and stuccoing thereof, the coated wax pattern was placed for weighing on the Ohaus Brainweigh balance in the manner indicated in Example 5. The weight with respect to time was measured and the results are shown in the Figure by the dashed line indicated by C.

EXAMPLE 7

The procedure of Example 5 above was repeated, except that the following sequence was employed as set forth in Table 6 below:

TABLE 6

| Slurry | Approximate Time Between Coats For Drying | Stucco |
| --- | --- | --- |
| Hybrid | — | Zircon fluor |
| Colloidal | 2¼ hours | Molcoa[1] (70 mesh) |
| Hybrid | 3¾ hours | Molcoa[1] (30 mesh) |
| Colloidal | 4 hours | Molcoa[1] (30 mesh) |
| Hybrid | 3¾ hours | Molcoa[1] (30 mesh) |
| Colloidal | 9 hours | Molcoa[1] (30 mesh) |

[1]An aluminosilicate from C.E. Minerals

After application of the sixth coat and stuccoing thereon, the coated pattern was placed on the Ohaus balance as described in Example 5 above. The weight of the coated pattern with time was measured. The results are illustrated in the Figure by the solid line A, with section B thereof depicting the area of constant weight with time.

A comparison of curves A and C in the Figure demonstrates that the sequential coating process of the invention provides drying characteristics consistent with a deposition bonding mechanism as explained above.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A process for providing a refractory composition on a surface comprising coating said surface with a first coating comprising one of either an acidic hybrid binder composition or a basic colloidal silica sol composition; drying said first coating, coating said dried first coating with a second coating comprising the other of said acidic hybrid binder composition and said basic colloidal silica sol composition, drying said second coating, and coating said dried second coating with a plurality of additional coatings of acidic hybrid binder composition and basic colloidal silica sol composition so that each of said additional coatings of said basic colloidal silica sol composition contacts a coating of acidic hybrid binder composition to form alternating coatings of said acidic hybrid binder composition and said colloidal silica sol composition; and drying each of said plurality of additional coatings prior to coating with the alternating coating for a sufficient time so that application of a subsequent coating thereto does not substantially soften said coating.

2. A process according to claim 1, including adding to said acidic hybrid binder composition in said one of said first and second coatings refractory filler so as to provide a hybrid binder slurry composition.

3. A process according to claim 1, including adding to said colloidal silica sol composition in said one of said first and second coatings refractory filler so as to provide a colloidal silica sol slurry composition.

4. A process according to claim 1, including adding refractory filler to both said acidic hybrid binder composition and said colloidal silica sol composition.

5. A process according to claim 1, 2, 3 or 4, wherein said plurality of additional coatings of basic colloidal silica sol and acidic hybrid binder compositions are coated alternately.

6. A process according to claim 1, 2, 3 or 4, including stuccoing each coat of the acidic hybrid binder composition and each coat of the basic colloidal silica sol composition with a refractory material prior to drying thereof.

7. A process according to claim 6, wherein the acidic hybrid binder composition is the result of combined ingredients comprising colloidal silica sol composition, a liquid material containing Si—OH groups, and a solvent which is capable of solubilizing the liquid material and the colloidal silica, wherein the liquid material and the colloidal silica are present in a ratio by weight of from about 1:12 to about 75:1, respectively, and wherein said liquid material has at least 20% by weight $SiO_2$ and said colloidal silica sol composition has at least about 15% by weight of $SiO_2$.

8. A process according to claim 6, wherein the hybrid binder composition comprises from about 5 to about 40% by weight of ethyl silicate that has been hydrated, said ethyl silicate containing from about 20% to about 60% by weight of $SiO_2$; from about 5 to 40% by weight of acidic colloidal silica containing from about 15 to about 60% by weight of $SiO_2$; and from about 20 to about 55% by weight of a solvent selected from methanol, ethanol, isopropyl alcohol, diethylene glycol monoethyl ether, propylene glycol monomethyl ether, propylene glycol monopropyl ether, ethylene glycol monoethyl ether, ethylene glycol monomethyl ether, propylene glycol monoethyl ether, ethylene glycol monopropyl ether or mixtures thereof.

9. A process according to claim 8, wherein the hybrid binder composition further comprises at least one aprotic, non-ionic, non-metallic, organic compound which contains at least one element selected from the group consisting of P, S, B, N, and mixtures thereof.

10. A process according to claim 6, wherein the hybrid binder composition further comprises from about 0.5 to about 12% by weight of dimethyl methyl phosphonate.

11. A process according to claim 10, wherein the basic colloidal silica sol composition contains about 30% by weight $SiO_2$ particles having an average size of from about 5 to about 30 nanometers.

12. A refractory composition applied to a surface comprising a first dried coating comprising one of either an acidic hybrid binder composition or a basic colloidal silica sol composition, a second dried coating comprising the other of said acidic hybrid binder composition and said basic colloidal silica sol composition, and a plurality of additional coatings selected from the group consisting of acidic hybrid binder composition and basic colloidal silica sol composition so that each of said additional coatings of said basic colloidal silica sol composition contacts one of said plurality of additional coatings of said acidic hybrid binder composition to form alternating coatings of said acidic hybrid binder composition and said basic colloidal silica sol composition, each of said plurality of additional coatings being dried prior to coating with the alternating coating for a sufficient time so that application of a subsequent coating thereto does not substantially soften said coating.

13. A refractory composition according to claim 12, wherein said acidic hybrid binder composition further comprises refractory filler to provide a hybrid binder slurry composition.

14. A refractory composition according to claim 12, wherein said colloidal silica sol composition further comprises refractory filler to provide a colloidal silica sol slurry composition.

15. A refractory composition according to claim 12, wherein both said acidic hybrid binder composition and said colloidal silica sol composition further comprise refractory filler.

16. A refractory composition according to claim 12, 13, 14 or 15, wherein each of said plurality of additional coatings of said acidic hybrid binder composition and basic colloidal silica sol composition are coated alternately.

17. A refractory composition according to claim 12, 13, 14 or 15, wherein each of said first and second dried coatings is stuccoed with a refractory material prior to drying thereof.

18. A refractory composition according to claim 17, wherein the hybrid binder composition is the result of combined ingredients comprising colloidal silica sol composition, a liquid material containing Si—OH groups, and a solvent which is capable of solubilizing the liquid material and the colloidal silica, wherein the liquid material and the colloidal silica are present in a ratio by weight of from about 1:12 to about 75:1, respectively, and wherein said liquid material has at least 20% by weight $SiO_2$ and said colloidal silica sol composition has at least about 15% by weight of $SiO_2$.

19. A refractory composition according to claim 17, wherein the hybrid binder composition comprises from about 5 to about 40% by weight of ethyl silicate that has been hydrated, said ethyl silicate containing from about 20% to about 60% by weight of $SiO_2$; from about 5 to 40% by weight of acidic colloidal silica containing from about 15 to about 60% by weight of $SiO_2$; and from about 20 to about 55% by weight of a solvent selected from methanol, ethanol, isopropyl alcohol, diethylene glycol monoethyl ether, propylene glycol monomethyl ether, propylene glycol monopropyl ether, ethylene glycol monoethyl ether, ethylene glycol monomethyl ether, propylene glycol monoethyl ether, ethylene glycol monopropyl ether or mixtures thereof.

20. A refractory composition according to claim 19, wherein the hybrid binder composition further comprises at least one aprotic, non-ionic, non-metallic, organic compound which contains at least one element selected from the group consisting of P, S, B, N, and mixtures thereof.

21. A refractory composition according to claim 19, wherein the hybrid binder composition further comprises from about 0.5 to about 12% by weight of dimethyl methyl phosphonate.

22. A refractory composition according to claim 21, wherein the colloidal silica sol composition contains about 30% by weight $SiO_2$ particles having an average size of from about 5 to about 30 nanometers.

23. A refractory composition comprising a plurality of layers of hardened acidic hybrid binder composition alternating with a plurality of layers of hardened basic colloidal silica sol composition.

24. A refractory composition according to claim 23, wherein at least one of said layers of said hardened acidic hybrid binder composition further includes therein refractory filler.

25. A refractory composition according to claim 23, wherein at least one of said layers of the hardened basic colloidal silica sol composition further includes refractory filler.

26. A refractory composition according to claim 23, wherein said layers of hardened acidic hybrid binder composition and said layers of hardened basic colloidal silica sol composition both further include refractory filler therein.

27. A refractory composition according to claim 26, including a seal coat applied to the outermost coating of said composition.

28. A refractory composition according to claim 26, wherein at least one layer of hardened acidic hybrid binder composition and at least one layer of hardened basic colloidal silica sol composition further comprises stuccoed refractory material.

29. A refractory composition according to claim 23, 24, 25 or 26, wherein the acidic hybrid binder composition is the result of combined ingredients comprising colloidal silica sol composition, a liquid material containing Si—OH groups, and a solvent which is capable of solubilizing the liquid material and the colloidal silica, wherein the liquid material and the colloidal silica are present in a ratio by weight of from about 1:12 to about 75:1, respectively, and wherein said liquid material has at least 20% by weight $SiO_2$ and said colloidal silica sol composition has at least about 15% by weight of $SiO_2$.

30. A refractory composition according to claim 23, 24, 25 or 26, wherein the hybrid binder composition comprises from about 5 to about 40% by weight of ethyl silicate that has been hydrated, said ethyl silicate containing from about 20% to about 60% by weight of $SiO_2$; from about 5 to 40% by weight of acidic colloidal silica containing from about 15 to about 60% by weight of $SiO_2$; and from about 20 to about 55% by weight of a solvent selected from methanol, ethanol, isopropyl alcohol, diethylene glycol monoethyl ether, propylene glycol monomethyl ether, propylene glycol monopropyl ether, ethylene glycol monoethyl ether, ethylene glycol monomethyl ether, propylene glycol monoethyl ether, ethylene glycol monopropyl ether or mixtures thereof.

31. A refractory laminate composition according to claim 30, wherein the hybrid binder composition further comprises at least one aprotic, non-ionic, non-metallic, organic compound which contains at least one element selected from the group consisting of P, S, B, N, and mixtures thereof.

32. A refractory composition according to claim 30, wherein the hybrid binder composition further comprises from about 0.5 to about 12% by weight of dimethyl methyl phosphonate.

33. A refractory composition according to claim 32, wherein the colloidal silica sol composition contains about 30% by weight $SiO_2$ particles having an average size of from about 5 to about 30 nanometers.

34. A process for providing a refractory composition on a surface comprising coating said surface with a first coating comprising one of either an acidic hybrid binder composition or a basic colloidal silica sol composition, drying said first coating so as to avoid the formation of a gel before substantial shrinkage occurs, coating said dried first coating with a second coating comprising the other of said acidic hybrid binder composition and said basic colloidal silica sol composition, and drying said second coating, so as to form alternating layers of said acidic hybrid binder composition and said basic colloidal silica sol composition, and whereby said first coating is dried sufficiently so that the application of said second coating does not substantially soften said first coating.

35. A process according to claim 1, wherein said drying of said first coating is sufficient to avoid the formation of a gel.

36. A process according to claim 1, wherein said drying of said first and second coatings comprises removal of at least about 40% of the total volatile material of said applied first and second coatings.

37. A process according to claim 1, wherein said drying of said first and second coatings is sufficient to avoid the formation of a gel.

38. A process according to claim 36, wherein said drying of said first and second coatings comprises removal of between about 60 and 80% of the total volatile material of said applied first and second coatings.

39. A process according to claim 36, wherein said drying of said plurality of additional coatings comprises removal of at least about 40% of the total volatile material of said applied additional coatings.

40. A process according to claim 38, wherein said drying of said plurality of additional coatings comprises removal of between about 60 and 80% of the total volatile material of said applied additional coatings.

41. A process according to claim 1, wherein coating steps are carried out by dipping into either said acidic hybrid binder composition or said basic colloidal silica sol composition.

42. A process according to claim 1, wherein said drying of said first and second coatings is carried out for at least one hour.

43. A process according to claim 34, wherein said drying of said first and second coatings comprising removal of at least about 40% of the total volatile material of said applied first and second coatings.

44. A process according to claim 34, wherein said drying of said first and second coatings is sufficient to avoid the formation of a gel.

45. A process according to claim 34, including coating said dried second coating with a plurality of additional coatings of acidic hybrid binder composition and basic colloidal silica sol composition so that each of said additional coatings of said basic colloidal silica sol composition contacts a coating of acidic hybrid binder composition so as to form additional alternating coatings of said acidic hybrid binder composition and said basic colloidal silica sol composition, and drying each of said plurality of additional coatings of said acidic hybrid binder composition and said basic colloidal silica sol composition prior to coating with the alternate coating.

46. A process according to claim 45, wherein said drying of said first and second coatings comprises removal of at least about 40% of the total volatile material of said applied first and second coatings.

47. A process according to claim 46, wherein said drying of said first and second coatings comprises removal of between about 60 and 80% of the total volatile material of said applied first and second coatings.

48. A process ccording to claim 46, wherein said drying of said plurality of additional coatings comprises removal of at least about 40% of the total volatile material of said applied additional coatings.

49. A process according to claim 47, wherein said drying of said plurality of additional coatings comprises removal of between about 60 and 80% of the total volatile material of said applied additional coatings.

50. A process according to claim 43, wherein said drying of said first and second coatings comprises removal of between about 60 and 80% of the total volatile material of said applied first and second coatings.

51. A process according to claim 43, wherein said drying of said plurality of additional coatings comprises removal of at least about 40% of the total volatile material of said applied additional coatings.

52. A process according to claim 50, wherein said drying of said plurality of additional coatings comprises removal of between about 60 and 80% of the total volatile material of said applied additional coatings.

53. A refractory composition applied to a surface comprising a dried first coating comprising one of either an acidic hybrid binder composition or a basic colloidal silica sol composition, said first coating being dried sufficiently so that the formation of a gel is thereby avoided, and a second dried coating comprising the other of said acidic hybrid binder composition and said basic colloidal silica sol composition, thereby forming alternating coatings of said acidic hybrid binder composition and said basic colloidal silica sol composition, and whereby said dried first coating has been dried sufficiently so that the application of said second coating does not substantially soften said first coating.

54. A refractory composition according to claim 12, wherein said first and second coatings are dried sufficiently so that the formation of a gel is thereby avoided.

55. A refractory composition according to claim 12, wherein at least about 40% of the total volatile materials have been removed from said dried first and second coatings.

56. A refractory composition according to claim 55, wherein between about 60 and 80% of the total volatile materials have been removed from said dried first and second coatings.

57. A refractory composition according to claim 53, including a plurality of additional coatings selected from the group consisting of acidic hybrid binder compositions and basic colloidal silica sol compositions so that each of said coatings of said basic colloidal silica sol compositions in said plurality of additional coatings contacts a coating of an acidic hybrid binder composition so as to form alternating coatings of said acidic hybrid binder composition and said basic colloidal silica sol composition, each of said plurality of additional coatings being dried prior to being coated with said alternating coating.

58. A refractory composition according to claim 53, wherein each of said first and second coatings includes refractory filler.

59. A refractory composition according to claim 57, wherein each of said plurality of additional coatings alternate between said acidic hybrid binder composition and said basic colloidal silica sol composition.

60. A refractory composition according to claim 53, wherein said acidic hybrid binder composition comprises a colloidal silica sol composition, a liquid material containing Si—OH groups, and a solvent which is capable of solubilizing the liquid material and the colloidal silica.

61. A refractory composition according to claim 53, wherein said hybrid binder composition comprises from about 5% to about 40% by weight of ethyl silicate that has been hydrated, said ethyl silicate containing from about 20% to about 60% by weight SiO$_2$; from about 5% to about 40% by weight of acidic colloidal silica containing from about 15% to about 60% by weight SiO$_2$; and from about 20% to about 55% by weight of a solvent.

62. A process for providing a refractory composition on a surface comprising coating said surface with a first coating comprising one of either an acidic hybrid binder composition or a basic colloidal silica sol composition, stuccoing said first coating with a refractory material prior to drying said first coating, drying said first coating, coating said dried first coating with a second coating comprising the other of said acidic hybrid binder composition and said basic colloidal silica sol composition, drying said second coating, and coating said dried second coating with a plurality of additional coatings of acidic hybrid binder composition and basic colloidal silica sol composition so that each of said additional coatings of said basic colloidal silica sol composition contacts a coating of acidic hybrid binder composition to form alternating coatings of said acidic hybrid binder composition and said basic colloidal silica sol composition, and drying each of said plurality of additional coatings of said acidic hybrid binder composition and said basic colloidal silica sol composition prior to coating with the alternate coating.

63. A process according to claim 62, including stuccoing said second coating with a refractory material prior to drying said second coating.

64. A process according to claim 63, including stuccoing each of said plurality of additional coatings with a refractory material prior to drying each of said plurality of additional coatings.

65. A process according to claim 62, wherein said drying of said first and second coatings comprising removal of at least about 40% of the total volatile material of said applied first and second coatings.

66. A process according to claim 62, wherein said drying of said first and second coatings is sufficient to avoid the formation of a gel.

67. A process according to claim 65, wherein said drying of said first and second coatings comprises removal of between about 60 and 80% of the total volatile material of said applied first and second coatings.

68. A process according to claim 65, wherein said drying of said plurality of additional coatings comprises removal of at least about 40% of the total volatile material of said applied additional coatings.

69. A process according to claim 67, wherein said drying of said plurality of additional coatings comprises removal of between about 60 and 80% of the total volatile material of said applied additional coatings.

70. A refractory composition prepared on a surface comprising a dried first coating comprising one of either an acidic hybrid binder composition or a basic colloidal silica sol composition, said first coating being stuccoed with a refractory material prior to drying, a second dried coating comprising the other of said acidic hybrid binder composition and said basic colloidal silica sol composition, and a plurality of additional coatings selected from the group consisting of acidic hybrid binder compositions and basic colloidal silica sol compositions so that each of said coatings of said basic colloidal silica sol compositions in said plurality of additional coatings contacts a coat of an acidic hybrid binder composition so as to form alternating coatings of said acidic hybrid binder composition and said basic colloidal silica sol composition, each of said plurality of additional coatings being dried prior to being coated with the alternating coating.

71. A refractory composition according to claim 70, wherein each of said first and second coatings includes refractory filler.

72. A refractory composition according to claim 70, wherein each of said plurality of additional coatings alternates between said acidic hybrid binder composition and said basic colloidal silica sol composition.

73. A refractory composition according to claim 70, wherein said acidic hybrid binder composition comprises a colloidal silica sol composition, a liquid material containing Si—OH groups, and a solvent which is capable of solubilizing the liquid material and the colloidal silica.

74. A refractory composition according to claim 73, wherein said liquid material and said colloidal silica are present in a ratio of weight of from about 1:12 to about 75:1 respectively, and wherein said liquid material has at least 20% by weight $SiO_2$ and said colloidal silica sol composition has at least about 15% by weight of $SiO_2$.

75. A refractory composition according to claim 70, wherein said hybrid binder composition comprises from about 5% to about 40% by weight of ethyl silicate that has been hydrated, said ethyl silicate containing from about 20% to about 60% by weight $SiO_2$; from about 5% to about 40% by weight of acidic colloidal silica containing from about 15% to about 60% by weight $SiO_2$; and from about 20% to about 55% by weight of a solvent.

76. A refractory composition according to claim 75, in which said solvent is selected from the group consisting of methanol, ethanol, isopropyl alcohol, diethylene glycol monoethyl ether, propylene glycol monoethyl ether, propylene glycol monopropyl ether, ethylene glycol monoethyl ether, ethylene glycol monoethyl ether, propylene glycol monoethyl ether, ethylene glycol monopropyl ether, and mixtures thereof.

77. A refractory composition according to claim 76, wherein said hybrid binder composition further comprises at least one aprotic, non-ionic, non-metallic, organic compound which contains at least one element selected from the group consisting of P, S, B, N and mixtures thereof.

78. A refractory composition according to claim 76, wherein said hybrid binder composition further comprises from about 0.5 to about 12% by weight of dimethyl methyl phosphonate.

79. A refractory composition according to claim 78, wherein said coloidal silica sol composition contains from about 30% by weight $SiO_2$ particles having an average size of from about 5 to about 30 nanometers.

* * * * *